Nov. 9, 1948.　　　　J. D. BURNS　　　　2,453,407
WELDING LINE REEL SWITCH
Filed Sept. 11, 1944　　　　　　　　2 Sheets-Sheet 1
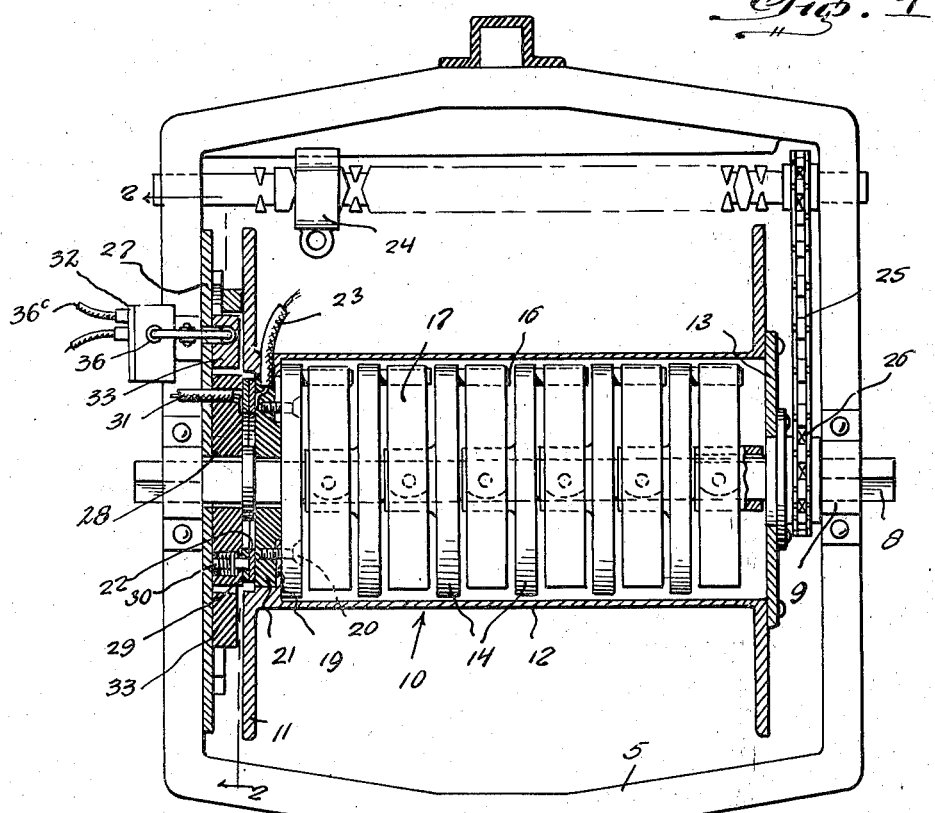
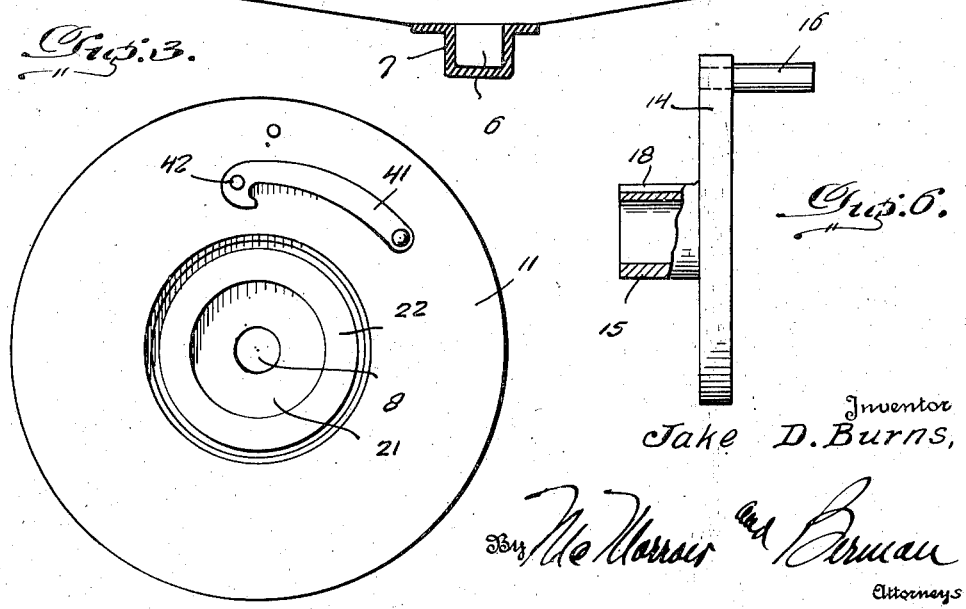
Inventor
Jake D. Burns,
Attorneys Nov. 9, 1948.  J. D. BURNS  2,453,407
WELDING LINE REEL SWITCH
Filed Sept. 11, 1944  2 Sheets-Sheet 2

Inventor
Jake D. Burns,
Attorneys

Patented Nov. 9, 1948

2,453,407

UNITED STATES PATENT OFFICE 2,453,407

WELDING LINE REEL SWITCH

Jake D. Burns, Richmond, Calif.

Application September 11, 1944, Serial No. 553,621

2 Claims. (Cl. 200—153)

1

The present invention relates to new and useful improvements in reels for electric cables and more particularly for use in reeling and unreeling the cable of welding machines and the invention has for its primary object to provide a reel of this character embodying means by which a switch for the circuit for the machine may be opened or closed to start and stop the machine and controlled through predetermined movements of the reel.

More specifically the invention comprises a cable reel of this character embodying switch means and stops carried by a stationary part of the reel and in which a dog carried by the reel is engageable with the stops for closing the circuit when the dog is engaged with one of the stops and opening the circuit when the dog is engaged with another of said stops.

A still further object is to provide an apparatus of this character of simple and practical construction, which is efficient and reliable in performance, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a longitudinal sectional view through the reel.

Figure 3 is an end elevational view of one end of the reel showing the dog carried thereby.

Figure 6 is an edge elevational view of one of the mountings for the springs.

Figure 2:
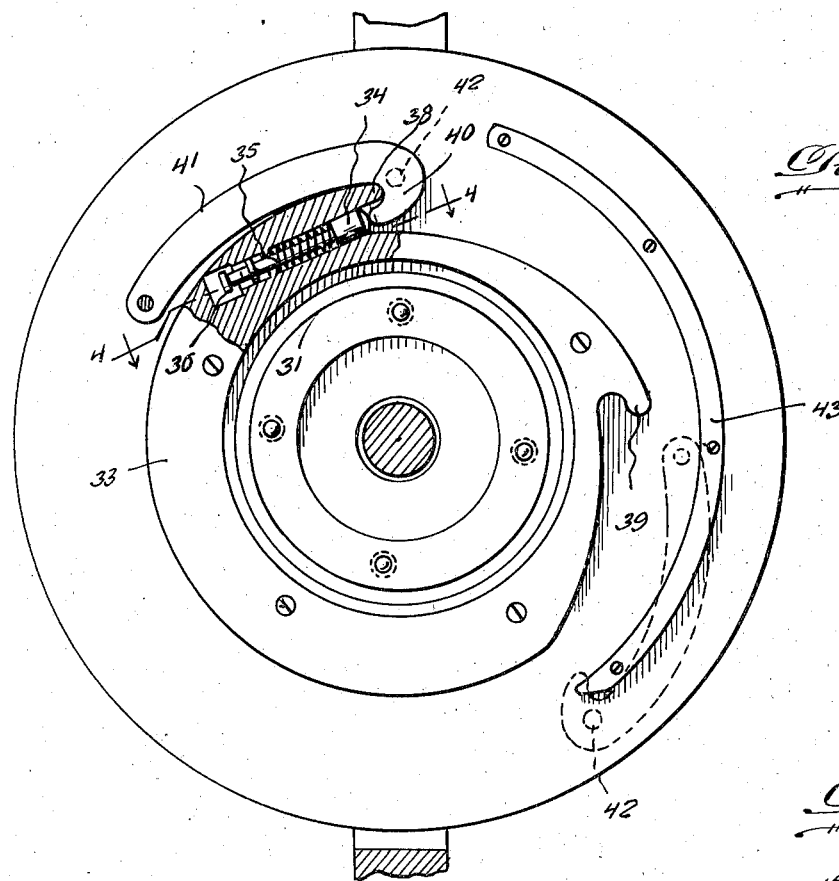
Figure 2 is a transverse sectional view taken substantially on a line 2—2 of Figure 1.
Figure 4:
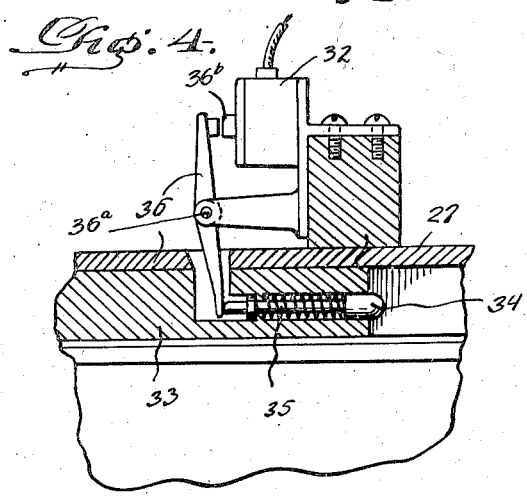
Figure 4 is a fragmentary sectional view through the switch taken substantially on a line 4—4 of Figure 2.
Figure 5:
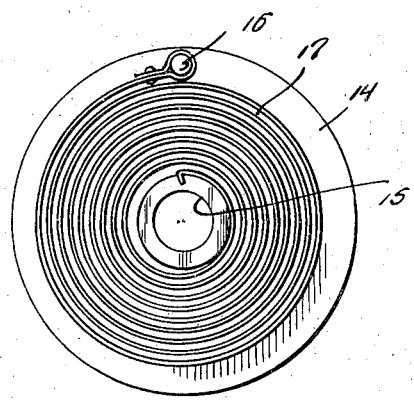
Figure 5 is a side elevational view of one of the springs for winding the reel.

Referring now to the drawings in detail wherein for the purpose of illustration I have disclosed a preferred embodiment of the invention, the numeral 5 designates an open frame having trunnions 6 at opposite edges provided with insulation covers 7 and by means of which the frame may be pivotally supported on a suitable structure (not shown).

A shaft 8 is secured transversely of the frame by means of the brackets 9, the shaft having squared ends to secure the shaft stationary. Rotatably mounted on the shaft within the frame is a hollow reel 10 including flanges 11 at each end thereof and a tubular hub portion 12. At one end of the reel is an end plate 13 journaled on the shaft and positioned in the hub 12 of the reel is a plurality of discs 14 including hub portions 15 journaled on the shaft and projecting from one side of the discs, each of the discs also having an eccentric pin 16 projecting from an opposite side thereof and to which one end of a coil spring 17 is attached, the other end of the spring being engaged in a slot 18 of the hub portion of an adjacent disc whereby the springs and discs are connected in assembled relation as shown to advantage in Figure 1 of the drawings and combined to rotate the reel when the springs are placed under tension. One of the end discs 14 is secured to an inwardly extending flange 19 on the hub portion of the disc by means of screws 20 which are also employed for securing an insulation disc 21 in the end of the reel opposite from the end plate 13.

A conductor ring 22 is secured to the outer surface of the disc 21 and to which one end of a cable 23 is attached for winding on the reel through a conventional form of spooling guide 24 mounted in the frame, the spooling guide being operated through a chain and sprocket 25 and 26 connected to the end plate 13 of the reel.

To the side of the frame 5 adjacent the conductor ring 22 is secured a disc 27 having an insulation disc 28 attached to the inner face thereof and to which a conductor ring 29 is attached in wiping engagement with the conductor ring 22. The conductor ring 29 is provided with a plurality of spring projected contacts 30 recessed in the insulation disc 28 and having their outer ends bearing against the conductor ring 22 to insure an effective connection between the conductor rings.

A circuit wire 31 connects the conductor ring 29 with the welding machine (not shown) and the operation of the machine is controlled by a switch 32 secured to the disc 27. A hub 33 is attached to the inner side of the disc 27 having a spring projected plunger 34 slidably mounted in a recess therein and yieldably urged outwardly by a coil spring 35, the inner end of the plunger being adapted for engaging one end of a rocker arm 36 pivoted intermediate its ends on a bracket 36a and having its other end arranged for actuating a switch button 36b when the plunger is moved inwardly, the switch being connected to the machine by means of the circuit wires 36c.

The peripheral edge of the insulation hub 33 is formed at circumferentially spaced intervals with hook shaped portions 38 and 39, the hook shaped portion 38 being disposed immediately adjacent the plunger 34 and adapted for engagement by the hooked end 40 of a dog 41 pivoted to the adjacent flange 11 of the reel.

Accordingly during the rotation of the reel the pawl of the dog 41 is adapted for engagement with either of the hook portions 38 or 39 of the stationary hub 33 and when the pawl of the dog 41 is in engagement with the hook portion 38, the pawl of the dog will engage the plunger 34 to move the same inwardly to open the switch. Accordingly, when the dog 41 is engaged with the hook portion 38 the circuit will be open and when the dog is engaged with the hook portion 39 the circuit will be closed.

In order to release the dog 41 from the hook portion 39 and to engage the hook portion 38 for opening the circuit, a slight pull is exerted on the cable by the operator to partially rotate the reel against the tension of the spring until the dog reaches a position shown by the dotted lines in Figure 2 of the drawings, whereby a pin 42 carried at the free end of the dog will move behind an arcuate guide strip 43 positioned over the hook portion 39 and secured to the disc 27 to guide the dog past the hook portion 39, the springs operating to rotate the reel until the dog reaches the end of the guide 43 whereupon the dog will drop into engagement with the hook 38 and actuate the plunger 34 of the switch to open the circuit, as shown by the full line position in Fig. 2.

Either of the hook members 38 and 39, when engaged by the dog will serve to secure the reel against rotation under the influence of the spring 17.

With one end of the barrel spring secured to the stationary shaft and the other to the hub of the reel, the spring will actuate the reel, when released, to wind a cable thereon. The dog with the pawl at the end functions similar to corresponding elements of a shade roller wherein a welder may start and stop his machine from any point along the line by pulling the line so that it will turn the reel through one-quarter of a revolution from the starting position, or a position in which the reel is stationary and as the line is released, the pawl of the dog will engage one of the projections 38 or 39, which will arrest and stop rotation of the reel. When the pawl engages the projection 38, the plunger 34 thereof will actuate the switch in the circuit through the cable. Slight accelerated motion will cause the dog to travel outward by centrifugal force wherein the pin 42 will ride along the guide 43 to hold it out of engagement with the projection 39. The cable may be held, however, so that the reel will wind slowly and in slow motion will permit the dog to drop downward, wherein the pawl will engage the projection on the next turn.

The reel may, therefore, be operated to pay the cable out or to wind the cable thereon by the spring motor in the drum thereof from any point along the line by a short pull on the cable or by a slight pull on the cable to retard the winding motion of the reel.

It is believed the details of construction, manner of operation and advantages of the device will be readily understood from the foregoing without further detailed explanation.

Having thus described the invention, what I claim is:

1. In a self-winding reel for electric cables and the like, the combination, which comprises a drum with flanges at the ends providing a cable-winding reel, a stationary shaft, means rotatably mounting the reel on the shaft, said shaft mounted in the sides of the frame with the reel positioned in an opening in the frame, a plurality of spring elements positioned in the drum of the reel forming a spring motor with one end of the spring elements attached to the shaft and the opposite ends attached to the reel, a stationary disc on the frame positioned between the reel and a side of the frame, a hub with hook-shaped projections in recesses in the periphery thereof extending from the periphery of the disc, a dog carrying a pawl and having a pin projecting therefrom pivotally mounted on a flange at the end of the reel adjacent said stationary disc of the frame positioned to ride along the periphery of the hub and engage alternately the hook-shaped projections thereof, an arcuate guide strip attached to the surface of the disc positioned to be engaged by the pin of the pawl to hold the pawl out of engagement with at least one of the projections of the hub upon retraction of the cable-winding reel, a resiliently held plunger slidably mounted in the hub under one of said projections positioned to be engaged by the pawl, a switch positioned to be actuated by said plunger, and contact rings positioned on the ends of the reel and adjacent disc through which a circuit to a cable on the reel may be completed.

2. In a self-winding reel for electric cables and the like, the combination, which comprises a drum with flanges at the ends providing a cable-winding reel, a stationary shaft, means rotatably mounting the reel on the shaft, a frame, a plurality of spring elements positioned in the drum of the reel forming a spring motor with one end of the spring elements attached to the shaft and the opposite ends attached to the reel, a stationary disc on the frame positioned between the reel and frame, a hub with hook-shaped projections in recesses in the periphery thereof extending from the periphery of the disc, a dog carrying a pawl and having a pin projecting therefrom pivotally mounted on a flange at the end of the reel adjacent said stationary disc of the frame positioned to ride along the periphery of the hub and engage alternately the hook-shaped projections thereof, an arcuate guide strip also projecting from the surface of the disc positioned to be engaged by the pin of the pawl to hold the pawl out of engagement with one of the projections of the hub, a resiliently held plunger slidably mounted in the hub under one of said projections positioned to be engaged by the pawl, a switch positioned to be actuated by said plunger, and contact rings positioned on the ends of the reel and adjacent disc through which a circuit to a cable on the reel may be completed.

JAKE D. BURNS.

REFERENCES CITED

The following references are of record in the file of this patent:

UNITED STATES PATENTS

| Number | Name | Date |
|---|---|---|
| 459,705 | Greenfield | Sept. 15, 1891 |
| 1,100,139 | Mayers | June 16, 1914 |
| 1,659,293 | Hermann | Feb. 14, 1928 |
| 1,665,737 | Gough | Apr. 10, 1928 |
| 1,754,072 | Watts | Apr. 8, 1930 |
| 1,763,953 | Cohen | June 17, 1930 |
| 1,803,481 | Minty | May 5, 1931 |